United States Patent [19]
Miller

[11] 3,818,804
[45] June 25, 1974

[54] DUAL BRAKE SYSTEM
[75] Inventor: Paul J. Miller, Richmond Hts., Ohio
[73] Assignee: The Weatherhead Company, Cleveland, Ohio
[22] Filed: Dec. 13, 1971
[21] Appl. No.: 207,096

[52] U.S. Cl. .................... 92/23, 188/106 F, 92/63
[51] Int. Cl. ...................... F15b 15/26, F01b 7/00
[58] Field of Search..... 188/345, 170, 106 F, 106 P; 60/54.6 M; 90/15, 23, 63, 62, 24, 63

[56] References Cited
UNITED STATES PATENTS

| | | | |
|---|---|---|---|
| 2,432,076 | 12/1947 | Rothery | 92/23 |
| 2,512,150 | 6/1950 | Geren | 92/23 |
| 2,790,424 | 4/1957 | Giladett | 92/23 |
| 2,854,954 | 10/1958 | Howze | 92/63 |
| 3,097,726 | 7/1963 | Euga | 188/106 P |
| 3,260,168 | 7/1966 | Cruse | 92/24 |
| 3,477,549 | 11/1969 | Barton | 92/62 |
| 3,482,661 | 12/1969 | Merier | 188/106 F |
| 3,485,537 | 12/1969 | Schlor et al. | 303/9 |
| 3,576,236 | 4/1971 | Laverdant | 188/345 |
| 3,643,763 | 2/1972 | Itay | 188/106 F |
| 3,647,031 | 3/1972 | Burnett | 188/106 F |
| 3,653,470 | 4/1972 | Travis | 188/106 F |

Primary Examiner—Edgar W. Geoghegan
Assistant Examiner—A. M. Zupcic
Attorney, Agent, or Firm—McNemny, Farrington, Pearne & Gordon

[57] ABSTRACT

A slave brake actuator and dual control circuit wherein the actuator is energized by either of a pair of redundant fluid circuits and by an auxiliary mechanical control in case of a total circuit failure or for normal parking situations. The actuator includes a pair of tandemly arranged pistons each responsive to fluid pressure in a separate circuit to produce a braking force on a common brake member, the force of the rearward piston being transmitted through the forward piston. In tandem with the pistons is a spring loaded plunger operable to apply a mechanical brake force through the pistons. The actuator arrangement causes the fluid circuitry to be automatically proof-tested when energized to disengage the mechanical spring force.

3 Claims, 3 Drawing Figures

PATENTED JUN 25 1974
3,818,804
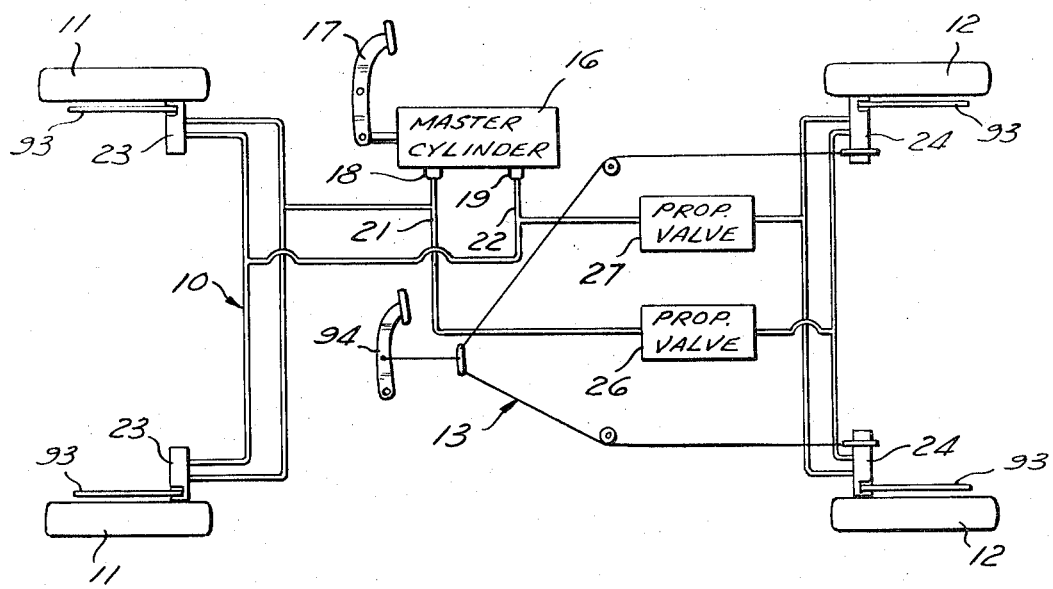
Fig. 1
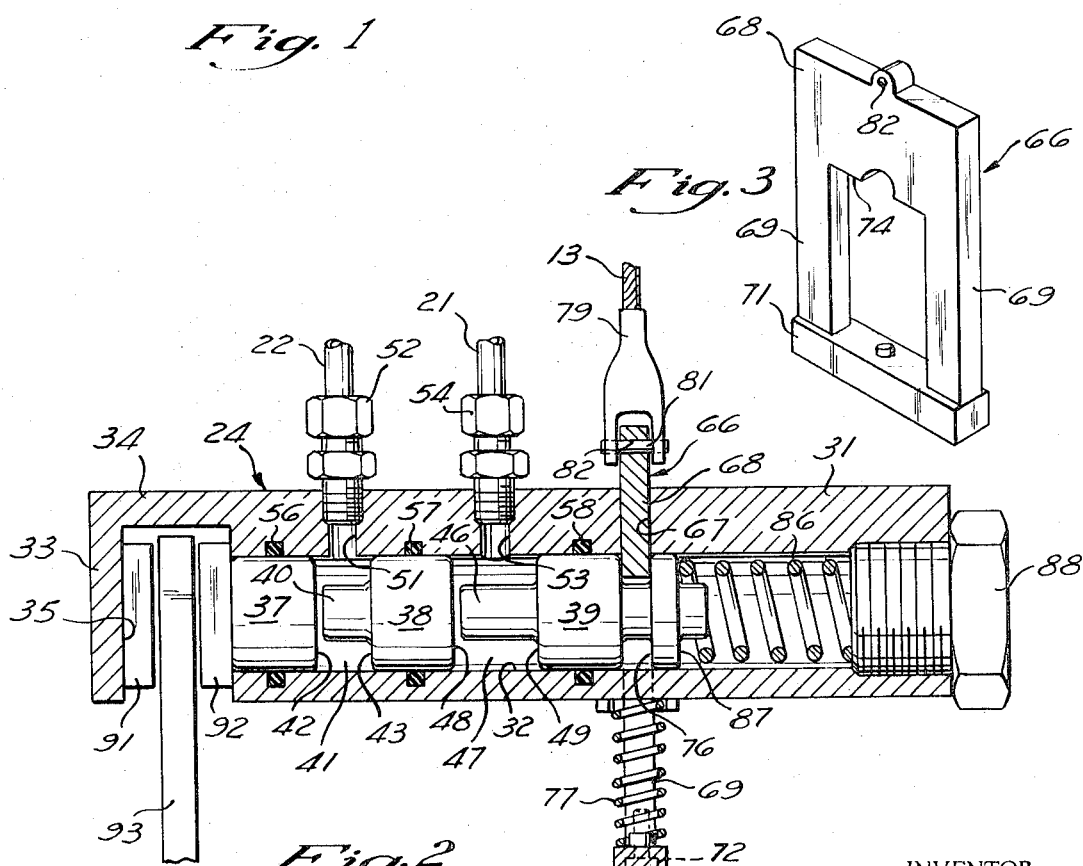
Fig. 3
Fig. 2
INVENTOR.
PAUL J. MILLER
BY
McNENNY, FARRINGTON, PEARNE & GORDON
ATTORNEYS

DUAL BRAKE SYSTEM

BACKGROUND OF THE INVENTION

The present invention relates to improvements in vehicle braking systems and, in particular, to a fluid or hydraulic slave brake actuator operable by either portion of a dual fluid brake circuit and by secondary mechanical means.

Most commonly, dual braking systems include a master cylinder having a pair of pressure chambers each exclusively controlling a separate circuit. Normally in an automobile, for example, one circuit controls the front wheels while the other circuit controls the rear wheels. Other systems have been proposed wherein the circuits of the dual system are fully redundant so that each circuit controls all of the wheels. A failure in only one circuit will result in a loss of braking at any wheel. Generally, prior braking systems of the latter type have not included provisions for mechanical operation of the slave brake actuators to be used in the event of a total circuit failure or in routine use as a parking brake.

SUMMARY OF THE INVENTION

The invention includes a slave brake actuator and a fully redundant dual fluid or hydraulic circuit for energization of each of a plurality of slave actuators by either circuit branch. Besides provision for energization by either circuit, the slave actuator of the invention includes means for mechanical brake energization independent of the fluid circuitry.

Once energized, the auxiliary mechanical means is self maintained until it is disengaged by the introduction of sufficient fluid pressure in either circuit. As a safety feature of the actuator, the secondary mechanical brake means may not be disengaged if both fluid circuits have failed or the system is in a hazardous state due, for example, to excessive wear or poor maintenance. A vehicle incorporating the invention is thereby prevented from being inadvertently or diliberately driven while in a dangerous condition.

In the preferred embodiment, the actuator comprises a housing having a bore in which a pair of pistons are tandemly arranged. Each piston responds to fluid pressure in an associated circuit by moving in a forward braking direction. Fluid pressure on either piston causes a braking force to be applied to a common braking member with the rearward piston applying its force through the forward piston. The tandem relationship permits at least one piston to be operated regardless of a circuit failure associated with the other piston.

Also in tandem with the brake pistons is a mechanically operated plunger adapted to apply a braking force on the braking member through both of the brake pistons and serve as a parking or emergency brake. preferably, the plunger is spring loaded such that when a latch holding the spring is released the spring produces a braking force on the braking member. The spring is adapted to maintain the braking force until a pressure is introduced into either or both fluid circuits sufficient to recompress the spring. In the disclosed arrangement such pressure automatically retracts the plunger into a latched nonoperative position. This arrangement is particularly adapted to motor vehicles having a four wheel disc brake system since the mechanically operated plunger provides a single parking or emergency brake system independent of the hydraulic system.

BRIEF DESCRIPTION OF THE DRAWING

FIG. 1 schematically illustrates a fluid brake circuit for a vehicle employing a brake actuator in a four wheel system in accordance with the invention;

FIG. 2 is a longitudinal sectional view of a preferred form of the slave brake actuator in accordance with the invention;

FIG. 3 is a perspective view of the latch member of the brake actuator.

DESCRIPTION OF THE PREFERRED EMBODIMENT

Referring now to the drawing, there is shown in FIG. 1 a diagramatic representation of a dual fluid brake circuit 10 for controlling the brakes of the pairs of front and rear wheels 11 and 12 respectively of a vehicle. An auxiliary mechanical cable control system 13 operates to brake the rear wheels 12 independently of operation through the dual fluid circuit 10.

The dual fluid circuit 10 includes a dual master cylinder 16 of conventional construction having a pair of tandem or otherwise arranged independent pressure chambers (not shown) within its housing. In the well known manner, each chamber normally produces a hydraulic fluid pressure equal to that in the other chamber when a brake 17 is depressed. Each pressure chamber has associated with it a single outlet port as shown at 18 and 19. As illustrated each of the outlet ports 18 and 19 is connected by a separate independent hydraulic branch circuit 21 and 22 to each slave brake actuator 23 and 24 of the pair of front and rear wheels 11 and 12. The circuits 21 and 22 are fully redundant since each circuit includes lines to all of the actuators 23 and 24.

In each circuit 21 and 22 a proportioning or pressure reducing valve 26 or 27 must be provided between the master cylinder 16 and the slave brake actuators 24 of the rear wheels 12 to decrease fluid pressure in the rear actuators 24 with respect to the pressure applied to the front actuators 23 in extreme braking situations where a substantial portion of the weight of the vehicle is transferred from the rear to the front wheels. As explained hereinbelow, the redundant circuitry insures that all of the slave brake actuators 23 and 24 will be energized even though one or the other of the circuits 21 or 22 fails due to a ruptured line or other possible cause of a loss of pressure and/or fluid. If desired, a pressure differential sensing device which may include a switch to operate a warning light may be connected to the two fluid circuits 21 and 22 to warn of a loss of pressure in one of the circuits.

FIG. 2 illustrates details of a slave brake actuator or wheel cylinder 24 such as employed at the rear wheels 12. The brake actuator 24 includes a caliper housing 31 having a longitudinal bore 32 wherein of generally uniform diameter. A leg 33 of the caliper housing 32 depends from a bridge or extension 34 of the housing to form a face 35 generally perpendicular to the axis of the bore 32. A forward or first cylindrical piston 37 is slidably received in an end of the bore 32 adjacent the caliper leg 33. Inward of the first piston 37 is a second or rearward tandem piston 38 slidably received in the bore 32. Adjacent the second piston 38 is a generally circular tandem plunger 39 also slidably carried in the bore 32.

Extending between the first and second pistons 37 and 38 is a rigid reduced cylindrical projection 40 integral with the second piston. The projection 40 determines a minimum spacing between the first and second pistons 37 and 38 so that a pressure chamber 41 is defined between opposed radial faces 42 and 43 of the first and second pistons 37 and 38 respectively and with the bore 32. Similarly, a rigid reduced cylindrical projection 46 extends between the second piston 38 and the plunger 39 to maintain these members apart by minimum distance and to thereby form a second pressure chamber 47 between opposed radial faces 48 and 49 of the second piston 38 and plunger 39 respectively. The projections 40 and 46 may, alternatively, be integral with the opposite piston faces 42 and 48, respectively, or may be separate elements having the same axial dimensions as the illustrated integral projections.

A radial opening or post 51 in the housing 31 communicates with the pressure chamber 41. The radial hole 51 is threaded to receive a fitting 52 by which a line of one fluid circuit 22 from the master cylinder 16 is connected to the pressure chamber 41. In the same manner, a radial opening or port 53 communicating with the pressure chamber 47 is threaded to receive a fitting 54 for coupling the other fluid circuit 21 from the master cylinder 16. Associated with each piston 37 and 38 and with the plunger 39 is at least one O-ring seal 56, 57 and 58 of rubber or elastomeric material to prevent axial leakage of fluid out of the pressure chambers 41 and 47. The seals 56, 57 and 58 are preferably disposed in circumferential grooves provided in the bore 32 for convenience in manufacturing and assembly of the actuator 24. It may be appreciated nevertheless that the seals, alternatively, may be arranged in grooves provided in the pistons and plunger to provide essentially the same sealing function.

The plunger 39 is maintained in the axial position illustrated in FIG. 2 by a latch member 66. The latch 66 is positioned in a radial slot 67 which extends through the wall of the housing 31 to the bore 32. As illustrated in FIG. 3, the latch member 66 comprises a flat yoke 68 having a pair of legs 69 to which a cross bar 71 is secured by bolts 72. The slots 67 extends through the housing 31 far enough to permit an edge 74 of the yoke 68 to rest on the end wall of the slot which preferably terminates in a flat surface including the axis of the bore 32. A peripheral groove 76 is formed in the plunger 39 for reception therein of the yoke 68. The yoke 68 is normally retained in this groove 76 by a compression spring 77 between the housing 31 and cross bar 71. The latch 66 is slidable in the slot 67 radially outwards far enough to permit it to pass out of the peripheral groove 76 of the plunger 39. A cable end 79 forming one end of the cable assembly 13 is fixed to the latch 66 by a pin 81 in a hole 82 in the yoke 68.

A relatively rigid compression spring 86 abuts a radial face 87 of the plunger 39 and urges the plunger towards the second or intermediate piston 38. An end plug 88 is threaded into the housing 31 at the end of the bore 32 to retain the compression spring 86 therein. A brake pad 91 is secured to the caliper leg 33 in a suitable known manner and a similar brake pad or lining 92 is affixed to the first piston 37 in a suitable known manner. The actuator 24 is mounted on the chassis of an automobile or other vehicle such that the brake pads 91 and 92 straddle a brake disc or rotor 93 which rotates with a wheel. Any conventional mounting arrangement for the actuator 24 may be used to permit the caliper housing 31 to move along its longitudinal axis relative to the rotor 93 when the first piston 37 moves its associated pad 92 against the rotor so that the other pad 91 is also brought into contact with the rotor 93.

In accordance with the present automotive practice of providing auxiliary mechanical brakes only at the rear wheels, the brake actuators 23 associated with the front wheels 11 need not include movable plungers 39 and related hardware. In this case, the actuators 23 may have the same general configuration as the rear actuators 24 described above but with a stationary end wall in place of the plunger 39 to define the chamber 47. Of course the same type of actuators 24 as used on the rear wheel may be provided at the front wheels when it would be advantageous to have the mechanical features of the rear actuators 24 at all of the wheels.

OPERATION

Under normal driving conditions, the brake pedal 17 is depressed to cause the master cylinder 16 to supply substantially equal pressure at its outlets 18 and 19 to each circuit 21 and 22. Pressurized fluid is thereby forced into both of the pressure chambers 41 and 47 from the circuits 22 and 21 respectively. Fluid pressure in the first chamber 41 drives the forward piston 37 to the left to cause the pads 91 and 92 to rub against the rotor 93 and thereby brake the associated wheel. Fluid pressure in the second chamber 47, equal to that in the first chamber 41, causes the second or rearward piston 38 to float between these chambers. The force produced by the pressure in the second chamber 47 forcing the plunger 49 away from the second piston 38 is resisted by the latch 68.

In the event that there is a failure in the fluid circuit 21 or the master cylinder chamber associated with the second chamber 47 such that fluid pressure is not supplied to this chamber 47 when the pedal 17 is depressed, the other circuit 22 will provide full braking. Pressure in this other circuit 22 and the first pressure chamber 41 will cause the second or rearward piston 38 to move towards the plunger 39 until it is stopped by the plunger projection 46. At this point pressure will move the first piston 37 to the left in a braking direction whereby the brake pads 91 and 92 will rub against the rotor 93.

On the other hand, if the first chamber 41 is not pressurized when the pedal 17 is depressed, owing to a failure in the associated circuit 22 or master cylinder chamber, pressure in the second chamber 27 will force the second piston 38 forwardly until the projection 40 engages the radial face 42 of the first piston 37. Further movement of the second piston 38 drives the first piston 37 forwardly to a point where the pads 91 and 92 brake the rotor 93.

From the foregoing discussion it is apparent that the actuator 24 will be fully energized when fluid pressure is directed to at least one of the pressure chambers 41 or 47 even though the other bhamber is not pressurized. Assuming that the front actuators 23 are provided with a piston and cylinder structure equivalent to the described rear actuators 24, all of the wheels will be fully braked by either of the separate circuits 21 and 22 regardless of failure of the other circuit.

The actuator 24 may be mechanically operated as a parking brake or as an emergency brake by depressing an auxiliary pedal or similar device 94 to thereby cause the cable system 13 to be tensioned. Sufficient tension in the cable system 13 pulls the latch 66 radially out of the plunger groove 76 to thereby release the plunger 39 and allow the compressed spring 86 to forcibly drive the plunger against the intermediate piston 38 and, in turn, the intermediate piston against the forward piston 37 and the brake pads 91 and 92 against the rotor 93. The various members are proportioned such that the ports 51 and 53 are not closed off by movement of the intermediate piston 38 or the plunger 39 so that the ports remain in communication with their respective chambers 41 and 47.

The braking force applied by the compression spring 86 may be released by restoring the plunger 39 to its latched position illustrated in FIG. 2. This may be accomplished by releasing the cable tension by releasing the pedal 94 and then depressing the brake pedal 17. Equal pressures in the fluid circuits 21 and 22 will cause the intermediate piston 38 to float between the pressure chambers 41 and 47 while the plunger 39 is forced to the right by pressure in the chamber 47 when the force of the spring 86 is overcome. The latch spring 77 automatically moves the latch 66 into the plunger groove 76 when the groove is retracted into alignment with the latch.

The plunger 39 may be reset or latched regardless of a fluid failure in a single circuit 21 or 22 in much the same manner as discussed above in respect to the brake function of the actuator 24. In the absence of pressure in the first chamber 41, fluid pressure in the second chamber 47 will move the plunger 39 rearwardly into its latched position. Alternatively, in the absence of pressure in the second chamber 47, fluid pressure in the first chamber 41 will cause the intermediate piston 38 to drive the plunger 39 into its retracted position.

As a significant safety feature, once the actuator is mechanically energized to brake the rotor 93 by unlatching the plunger 39, the plunger may not be relatched if sufficient pressure cannot be produced in either of the pressure chambers 41 or 47. In such cases as where the fluid level in both circuits is insufficient or the dual master cylinder will not provide adequate pressure in any circuit, the force of the brake spring 86 may not be removed until measures are taken to correct the deficiency. Thus, the hydraulic brake system is proof tested each time the auxiliary brake is disengaged.

Although a preferred embodiment of the invention has been shown and described in detail, it is to be understood that various modifications and rearrangements may be resorted to without departing from the scope of the invention. For example it is not necessary that the dual master cylinder normally produce equal pressures in the dual circuits 21 and 22 for proper operation of the actuator 24. The actuator 24 will function in the same general manner as that described above if one of the circuits 21 or 22 carries a proportionately greater pressure than the other. In such a case it may be desirable to vary the respective bores and face areas of the pistons 37 and 38 in accordance with the normal relation of pressures in the chambers 41 and 47 so that the intermediate piston 38 is normally permitted to float. Further, the actuator 24 may be employed in a hybrid system wherein drum brakes are employed at certain wheels. It may also be appreciated that the fluid circuit need not be redundant at all wheels but, rather, need only include isolated pressure lines at the wheels employing the actuators 24 of the invention.

What is claimed is:

1. A brake system for a wheeled vehicle comprising a dual fluid circuit and a slave brake actuator adapted to retard rotation of a wheel of the vehicle, said actuator including a housing having a bore therein, a first piston in said bore adapted to move a braking member into engagement with a rotating surface when a braking force is applied thereto, a port in said bore connected to one line of the dual circuit and adapted to admit pressurized fluid therein to a first chamber defined by said bore and said first piston, fluid pressure in said first chamber producing a braking force on said first piston, a second port in said bore connectec to the other line of the dual circuit and adapted to admit pressurized fluid therein to a second chamber defined by said bore and a second piston, fluid pressure in said second chamber producing a braking force on said second piston, means for transmitting braking forces on said second piston to said first piston, and secondary mechanical means for applying a braking force on said second piston, said secondary mechanical means including cable controlled releasable spring means for producing a brake force on the second piston.

2. A brake system as set forth in claim 1 wherein said first chamber is partly defined by portion of said second piston, fluid pressure in said first chamber urging said second piston to move in a direction opposite of the braking force of the spring means whereby the spring means may be reset to a nonoperative position when sufficient pressure exists in said first chamber.

3. A brake system as set forth in claim 2 wherein said secondary mechanical means includes a plunger slidable in said bore, said second chamber being partly defined by a portion of said plunger, fluid pressure in said second chamber urging said plunger in a direction opposite of the braking force of the spring means whereby the spring means may be reset to a nonoperative position when sufficient pressure exists in said second chamber.

* * * * *

UNITED STATES PATENT OFFICE
CERTIFICATE OF CORRECTION

Patent No. 3,818,804　　　　Dated　June 25, 1974

Inventor(s)　Paul J. Miller

It is certified that error appears in the above-identified patent and that said Letters Patent are hereby corrected as shown below:

Column 1, Line 18, after "will" and before "result" insert --not--

Column 1, Line 56, change "prefer-" to -- Prefer- --.

Column 2, Line 27, after "brake" insert -- pedal -- .

Column 2, Line 57, change "wherein" to -- therein -- .

Column 3, Line 19, change "post" to -- port -- .

Column 4, Line 12, change "hardward" to -- hardware -- .

Column 4, Line 17, change "wheel" to -- wheels -- .

Column 4, Line 53, change "27" to -- 47 -- .

Column 4, Line 62, change "bhamber" to -- chamber -- .

Column 6, Line 28, change "connectec" to -- connected -- .

Signed and sealed this 22nd day of October 1974.

(SEAL)
Attest:

McCOY M. GIBSON JR.
Attesting Officer

C. MARSHALL DANN
Commissioner of Patents